Patented Aug. 9, 1932

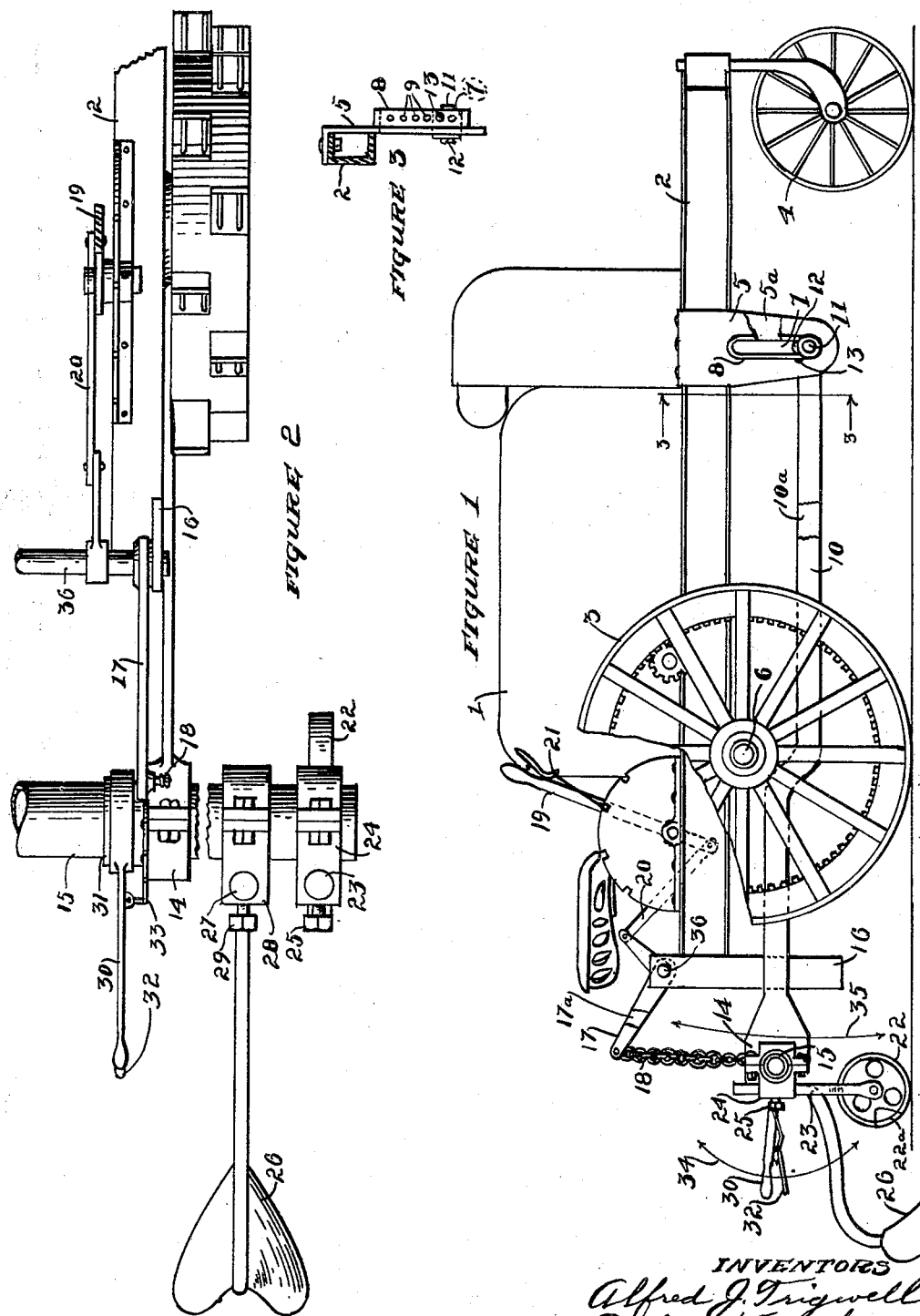

1,871,097

UNITED STATES PATENT OFFICE

ALFRED J. TRIGWELL, OF SALINAS, AND CARL H. TRUBSCHENCK, OF OAKLAND, CALIFORNIA

TRACTOR ATTACHMENT

Application filed February 3, 1931. Serial No. 513,109.

The present invention relates particularly to means for mounting earth working implements upon a tractor frame, and means for adjusting the same relative to the earth traversed by the tractor.

It is one object of the invention to provide means of the character indicated that will be readily adjustable to fix the effective working depth of the implements.

It is another object of the invention to provide a means of the character indicated connected to the tractor frame in such a manner that any increase in the power applied to moving the implements through the soil will urge the forward part of the tractor into more intimate contact with the ground.

It is still another object to provide means of the character indicated that will be an integral part of the tractor and positively supported against lateral movement with respect thereto.

It is also an object of the invention to provide means for adjusting the implements about their connection to the tractor frame, and also an independent adjusting means whereby the implements may be quickly and easily adjusted without disturbing the first named adjusting means.

A still further object of the invention is to provide means, in combination with the hereinbefore mentioned means, for allowing the implements to follow the contour of the ground over which the tractor passes.

Finally, it is an object of the invention to provide a tractor attachment of the character indicated that will be economical to manufacture, simple in form and construction, strong, durable, quickly and easily assembled and attached to a tractor frame, and highly efficient in its practical application.

In the drawing:

Figure 1 is a side elevation of a portion of a tractor embodying our invention.

Figure 2 is an enlarged plan view of a portion of the same.

Figure 3 is a view on line 3—3 of Figure 1.

In the structure as herein disclosed, we show at 1 a portion of a tractor, the main frame being shown at 2, with the drive wheels at 3 and front wheels at 4.

It will be understood, of course, that the parts now to be described, with the exception of the adjusting levers, are duplicated upon the opposite side of the tractor.

At 5—5a are shown a pair of brackets mounted on opposite sides of frame 2 and depending therefrom, and spaced back from the forward end of the frame about one-third of its length, thereby bringing them well forward of the drive wheels and the heavy driving mechanism of the tractor. Each bracket extends downwardly a distance below the horizontal level of the drive wheel axle 6 and is provided with a vertically disposed slot 7 having an outwardly directed flange as 8 encompassing the same. The flange 8 is provided with a plurality of vertically spaced holes 9.

A pair of draft arms are shown at 10—10a connected to bolts as 11, the bolts 11 being mounted in bearing blocks as 12 vertically adjustable in the slots by means of bolts as 13 passing therethrough and engaging holes 9. The rear ends of arms 10—10a are fitted with bearing blocks 14 in which is rotatably mounted a tube 15, the said tube lying in a horizontal plane at right angles to the draft line of the tractor and adjacent its rear end. These arms are held against lateral movement with respect to the tractor by means of vertically depending bars as 16 mounted on frame 2. The draft frame described is adjusted vertically about its pivot bolts by means of a bell-crank 17 on shaft 36 connecting bars 16 and connected to a block 14 by chain 18 and to a lever 19 by a link 20, the lever being held in the desired position by the usual locking device indicated at 21.

A support mounted on each end of the tube comprises a wheel as 22 mounted on a pintle 23 which is in turn rotatably mounted in a bearing block 24 rigidly mounted on tube 15. The wheel is adjustable vertically and is held by set screw 25.

At 26 is shown an earth working tool mounted on the tube 15 in the same manner as the wheel, the corresponding parts being shown at 27, 28, and 29.

A lever is shown at 30 rigidly mounted upon the tube 15 at 31, fitted with the usual latch mechanism at 32 operating in conjunction with a toothed sector 33 mounted on one of the bearing blocks 14.

By means of the construction above set forth, operation of the lever 19 operates to raise or lower the whole structure, while operation of the lever 30 will rotate the tube 15 thereby swinging all of the implements mounted thereon through an arc as 34, thereby permitting them to be manipulated independently of frame as a whole. The frame as a whole, when adjusted, moves through an arc as 35.

By placing the draft bar connections as shown any down pull tends to draw the tractor closer to the ground, whereas with the usual rear end hitch a down pull tends to lift the forward end of the tractor from the ground. By adjusting the forward ends of the draft bars vertically in slots 7—7a the working depth of the implements may be fixed, and by providing a flexible connection at 18 the implements are allowed to automatically seek the fixed level or depth, while wheels 22—22a enable them to maintain the proper depth when the tractor moves over rolling ground.

It is to be understood, of course, that while we have herein shown and described but one specific embodiment of the invention, changes in form, construction, and method of assembly and operation may be made within the scope of the appended claims.

We claim:

1. In combination, a tractor, a vertically adjustable frame pivotally mounted thereon forwardly of its rear axle and extending rearwardly thereof, said frame including a transversely disposed member adjustably journaled therein, and earth working implements mounted on said member.

2. In combination, a tractor, a vertically adjustable frame pivotally mounted thereon forwardly of its rear axle and extending rearwardly thereof, vertically adjustable wheels mounted on the rear end of the frame, the said frame including a transversely disposed member journaled therein, earth working implements mounted on said member, and means for rotatably adjusting said member in its journals.

ALFRED J. TRIGWELL.
CARL H. TRUBSCHENCK.